United States Patent
Bezner et al.

(10) Patent No.: US 7,110,519 B2
(45) Date of Patent: *Sep. 19, 2006

(54) ON DEMAND CALL RE-TERMINATION

(75) Inventors: Robert Bezner, Atlanta, GA (US); David Scott, Norcross, GA (US)

(73) Assignee: BellSouth Intellectual Property Corporation, Wilmington, DE (US)

(*) Notice: Subject to any disclaimer, the term of this patent is extended or adjusted under 35 U.S.C. 154(b) by 0 days.

This patent is subject to a terminal disclaimer.

(21) Appl. No.: 10/965,966

(22) Filed: Oct. 15, 2004

(65) Prior Publication Data
US 2005/0069118 A1    Mar. 31, 2005

Related U.S. Application Data

(63) Continuation of application No. 09/961,411, filed on Sep. 25, 2001, now Pat. No. 6,934,377.

(51) Int. Cl.
*H04M 3/42* (2006.01)
(52) U.S. Cl. ............................ 379/212.01; 379/207.02; 379/265.02
(58) Field of Classification Search ............ 379/265.06, 379/167.01, 201.01, 212.01
See application file for complete search history.

(56) References Cited

U.S. PATENT DOCUMENTS

| 5,661,791 | A | * | 8/1997 | Parker | 379/211.02 |
| 5,757,904 | A | * | 5/1998 | Anderson | 379/265.06 |
| 6,363,142 | B1 | * | 3/2002 | Stumer | 379/211.01 |
| 6,542,596 | B1 | * | 4/2003 | Hill et al. | 379/207.02 |
| 6,600,818 | B1 | * | 7/2003 | Peltola | 379/201.01 |
| 6,611,585 | B1 | * | 8/2003 | Carrion et al. | 379/212.01 |
| 6,785,379 | B1 | * | 8/2004 | Rogers et al. | 379/265.02 |
| 2002/0034289 | A1 | * | 3/2002 | Pershan | 379/207.02 |

* cited by examiner

*Primary Examiner*—Fan Tsang
*Assistant Examiner*—Md. S. Elahee
(74) *Attorney, Agent, or Firm*—Thomas, Kayden, Horstemeyer & Risley, LLP

(57) ABSTRACT

Disclosed are methods and systems for re-terminating telephone calls. A telephone call is established between a caller and a member of a subscriber. During the call, a sequence of key strokes is received from the member who uses customer premises equipment during the call. A subscriber list related to the subscriber is reviewed, based at least in part on the sequence of keys. The call is transferred to a component in the telephone network, and the call from the component is re-terminated.

16 Claims, 6 Drawing Sheets

ON DEMAND CALL RE-TERMINATION

CROSS REFERENCE TO RELATED APPLICATION

This document is a continuation of Ser. No. 09/961,411, filed Sep. 25, 2001 now U.S. Pat. No. 6,934,337, which is entirely incorporated herein by reference.

FIELD OF THE INVENTION

The present invention relates to telephone systems, and more particularly, to a system and method for re-termination of a telephone call.

BACKGROUND OF THE INVENTION

When a caller makes a telephone call to a telephone number that is shared by multiple members of a telephone service subscriber, that call is often answered by a member (the answering member) who is not the caller's desired or intended member (the intended member). This situation often occurs in, for example, a college dormitory room occupied by two or more students, a household of multiple members, an apartment shared by several roommates, and other similar dwelling units.

When the answering member finds out that he or she is not the person desired by the caller, he or she may offer to do one of several things for the caller. For example, if the intended member is unavailable, the answering member may offer to take a message from the caller. If the intended member is available, the answering member may ask the caller to wait while he or she passes the telephone handset to the intended member.

In a situation in which the intended member is not available, although the answering member may offer to take a message, that offer is not always acceptable to the caller for various reasons. For example, the caller is often put on hold or interrupted numerous times before the answering member successfully finds a piece of paper and a writing instrument. Furthermore, even if the caller leaves a message with the answering member, that message does not always reach the intended member successfully. For example, the piece of paper with the written message may be subsequently misplaced or the message may be incorrectly recorded by the answering member.

In a situation in which the intended member is available, it may be inconvenient for the answering member to get the intended member's attention. For example, if a father (the answering member) on the second floor bedroom answers a call for his son (the intended member) who is practicing drums in the basement, the father would have to go down two flights of stairs to get the son's attention.

In another situation in which the caller wishes to transmit a document to the subscriber who uses the same telephone line for both voice and data communication, the caller has to call a second time if the first call was answered by a person instead of a fax machine.

SUMMARY OF THE INVENTION

The present invention allows a subscriber to cause a previously answered incoming call to be re-terminated to the subscriber's telephone line.

A caller dials a telephone number of a subscriber. The subscriber may be a one-member subscriber or a multi-member subscriber. A member of the subscriber answers the call. The answering member may or may not be an intended member or a member desired by the caller. The answering member presses one or more keys on the keypad of a customer premises equipment (CPE), e.g., a telephone, to enter a sequence of keystrokes. The sequence of keystrokes may represent a code which provides information related to how the call should be re-terminated. The answering member hangs up after entering the sequence of keystrokes. The call is then re-terminated to the same telephone number.

When the call re-terminates, there are a number of options available to the subscriber as to how the re-terminated call may be picked up. For example, the call can be allowed to ring through to a voice mailbox associated with the intended member that was identified by the sequence of keystrokes. Alternatively, the call can be allowed to ring long enough to activate an answering machine. Similarly, the call can be picked up by a fax machine. The call may also ring to allow the intended member (e.g., the son in the basement) to answer the telephone. In an embodiment of the invention in which the re-terminated call uses a distinctive ringing tone determined by the sequence of keystrokes, the call is answered by an intended member who is associated with the distinctive ringing tone.

In an embodiment that can be implemented in an advanced intelligent network (AIN), the answering member can activate a service of the present invention by, for example, flashing a switch hook on the CPE and entering a feature code. The feature code may comprise, for example, a sequence of one or more characters and numbers on the keypad. The answering member's action is detected by a trigger provision on the subscriber's telephone line. Preferably, the trigger is a Custom Dialing Plan (CDP) trigger. The trigger causes a query to be sent to a service control point (SCP). At the SCP, the query is processed and an Analyze_Route message is returned.

The Analyze_Route message preferably contains the subscriber's telephone number. The call is transferred to a component within the AIN. Preferably, the component is a Service Node (SN). Once the call is transferred, an announcement can be played to instruct the answering member to hang up. Once the answering member hangs up, the component transfers the call back to the subscriber.

Another variation of this service allows the answering member to enter an ID code. This ID code applies a distinctive ringing tone or ringing pattern when the call is re-terminated. Multiple ID codes allow for multiple distinctive ring tones or ringing patterns. For a multi-member subscriber, each member of the subscriber can be associated with a distinctive ringing tone or pattern. In other embodiments, the ID code can be associated with a mailbox of a member of the subscriber.

Another variation of this service can be used to handle fax messages. If an unexpected fax call is answered by a member of the subscriber, the fax is lost unless the caller retries. With this feature the call could be re-terminated and picked up by the fax machine.

DETAILED DESCRIPTION OF EMBODIMENTS

Although preferred embodiments of the invention are described herein in the context of an advanced intelligent network (AIN), the invention may be adapted for many other telephone systems or networks. The AIN is described in U.S. Pat. Nos. 5,701,301, and 5,838,774, each of which is incorporated herein by reference in its entirety.

Figure 1:
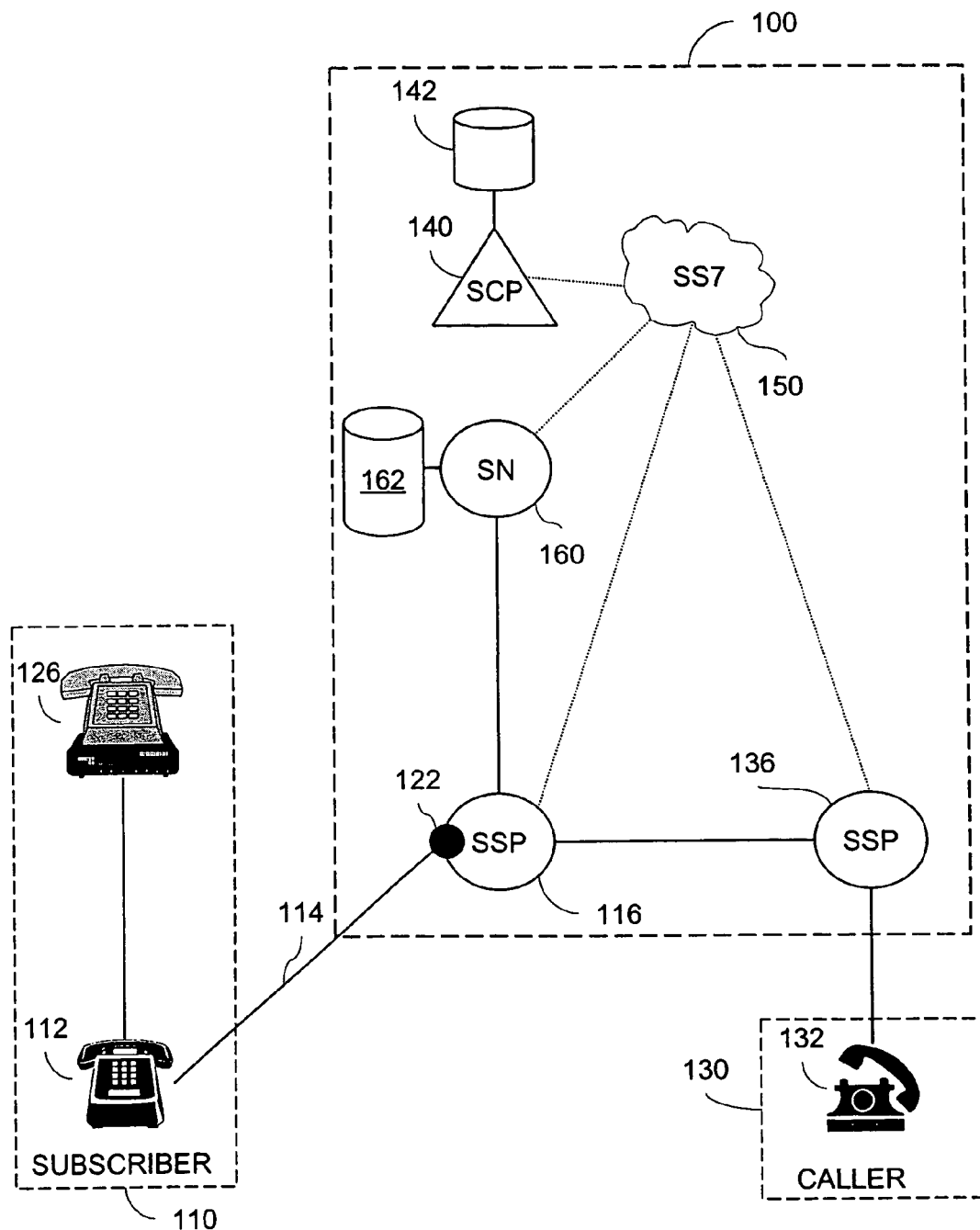
FIG. 1 is a schematic diagram showing an exemplary system architecture of an embodiment of the invention as implemented in an AIM.

FIG. 1 is a schematic diagram showing a system architecture of one embodiment of the invention as implemented in an AIN. Telephone network 100 comprises service control point (SCP) 140, database 142, service node (SN) 160, database 162, SS7 network 150, and service switching points (SSP) 122 and 136.

Subscriber 110 is a customer or service subscriber of the invention, and telephone network 100 is the service provider of the invention. Subscriber 110 may be a one-member subscriber or a multi-member subscriber. A multi-member subscriber may be, for example, several college students sharing a dormitory unit, two or more members of a household, or multiple roommates of an apartment.

Subscriber 110 has customer premises equipment (CPE) 112. CPE 112 may be a telephone set or another equipment or device, such as a computer or a cellular telephone, that can initiate or receive communication sessions using telephone line 114. Any member of subscriber 110 can initiate or receive calls through telephone line 114 using CPE 112. The telephone number associated with telephone line 114 is hereinafter referred to as the subscriber number. Telephone line 114 is connected to SSP 116. CPE 112 is also in communication with device 126. Device 126 may be any telephone related device such as, for example, an answering machine, a fax machine, or other similar equipment.

Caller 130 and CPE 132 are in communication with telephone network 100. Caller 130 may be part of a telephone network different from telephone network 100 or may be on telephone network 100. CPE 132 may be a landline telephone, a computer, or a wireless device. In any event, when caller 130 dials the telephone number of subscriber 110, the call is routed through an SSP within telephone network 100. Although caller 130 is shown to be connected to SSP 136, it is understood that in some circumstances caller 130 could be directly connected to SSP 116.

Telephone line 114 has one or more triggers 122 provisioned on SSP 116. Preferably, trigger 122 is a customer dialing plan (CDP) trigger. Trigger 122 can detect certain conditions associated with the status of telephone line 114. For example, trigger 122 can be programmed or otherwise adapted to detect the pressing of the "Flash" button or another action on CPE 112. When subscriber 110 presses the "Flash" button, trigger 122 sends a query to SCP 140, which processes the query and returns a message. The message instructs SSP 116 as to how the call should be re-terminated.

The query generally comprises the subscriber number in the Calling_Party_ID field of the query. Other information can be incorporated in the query.

SCP 140 uses the subscriber number to access subscriber information associated with subscriber 110. The subscriber information may, for example, be stored in database 142 associated with SCP 140. The subscriber information comprises a subscriber list. The subscriber list may contain, among other information, the name of each member of subscriber 110, a distinctive ringing tone or ringing pattern associated with each member, and a voice mailbox number of each member. The subscriber list may also be stored in another database. For example, the subscriber list may be stored in database 162.

Using the subscriber number, SCP 140 retrieves one or more call processing instructions from the subscriber list. The call processing instructions are then forwarded to SSP 116, which in turns processes the call accordingly.

In an AIN network, transmission of the query from SSP 116 to SCP 140 and the message or response from SCP 140 to SSP 116 is done using signaling over SS7 signaling system 150.

Figure 2:
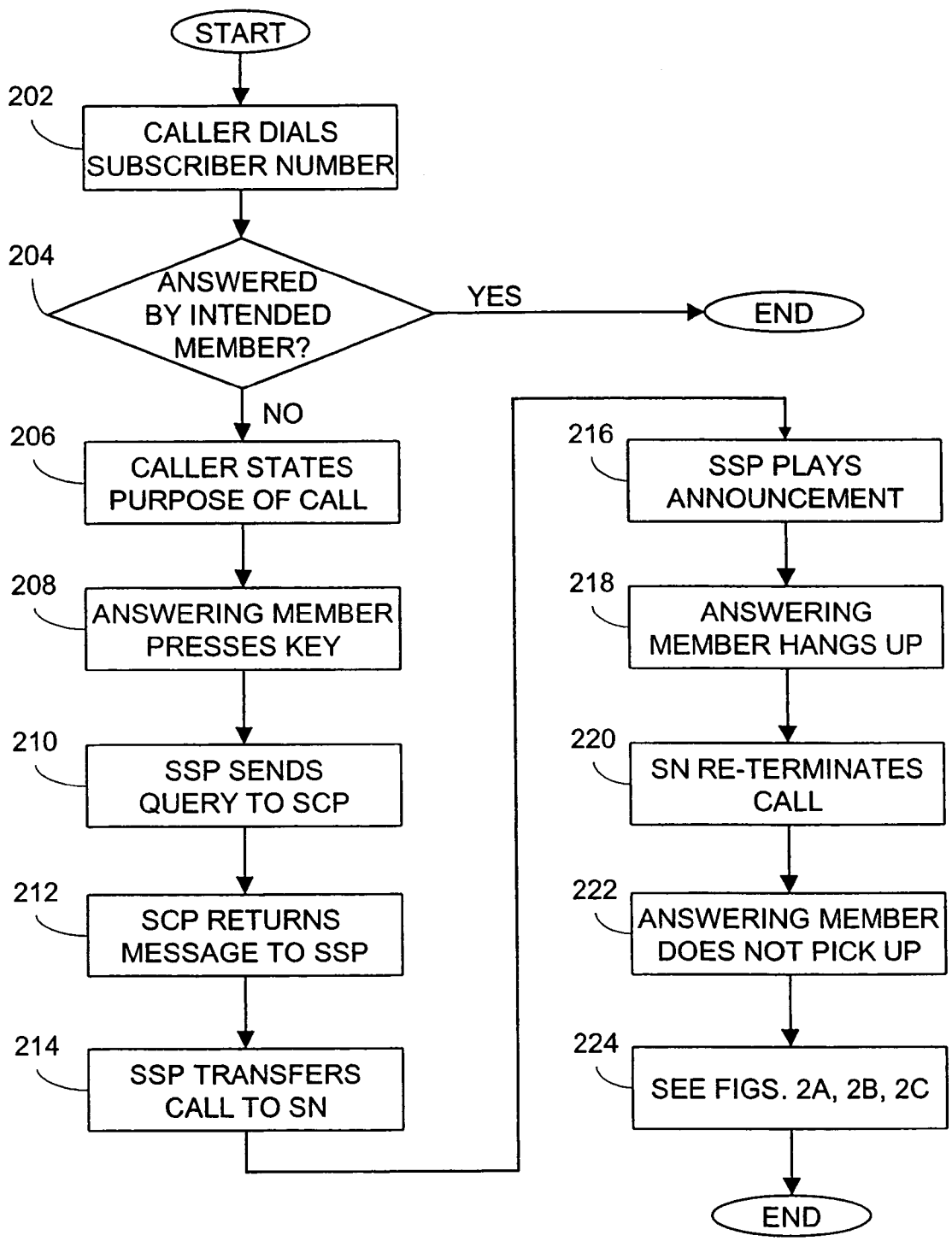
FIG. 2 is a flowchart illustrating exemplary steps that could be used to carry out an embodiment of the invention.

FIG. 2 is a flowchart illustrating exemplary steps involved in using the first embodiment of the invention. To more clearly describe the flowchart, references are made to components or elements shown in FIG. 1.

In step 202, caller 130 dials the subscriber number (telephone number assigned to telephone line 114) using CPE 132. When all digits of the subscriber number are dialed, a call is generated and routed to SSP 116, which causes CPE 112 to ring to indicate that a call has arrived.

In step 204, a member of subscriber 110 answers the call (the answering member). If this answering member happens to be caller 130's intended member with whom caller 130 desires to have a conversation, then the process ends and caller 130 and the intended member engages in a voice communication session. Otherwise, if the answering member is not the intended member, or caller 130 wishes to send a document by fax, then the process continues in step 206.

In step 206, caller 130 informs the answering member of his or her purpose for the call. For example, the purpose of caller 130 may be to speak with an intended member who is not the answering member. Another purpose may be that caller 130 wishes to fax a document to the answering member or other members of subscriber 110.

In step 208, the answering member enters a sequence of keystrokes. The sequence of keystrokes may be entered by the answering member by pressing one or more keys on the keypad of CPE 112. The keys pressed by the answering member can be any key on the keypad that have been programmed to implement a service of the invention or the switch hook. For example, the answering member may press the "Flash" key. The answering member may also press additional keys after the "Flash" key. For example, the answering member may press "Flash" followed by the number "8" key twice.

In step 210, when trigger 122 detects the sequence of keystrokes pressed by the answering member, trigger 122 causes SSP 116 to launch a query to SCP 140. The query may be, for example, a Custom Dialing Plan query. The query contains, among other information, the subscriber number in the Calling_Party_ID field. In addition, the query includes the numbers, if any, entered by the answering member following the "Flash" key in a Vertical Service Code field of the query.

In step 212, SCP 140 consults database 142 and returns a message to SSP 116. Using the information in the Calling-_Party_ID field of the query, which is the subscriber number, SCP 140 may access, for example, the subscriber list of subscriber 110. The message from SCP 140 to SSP 116 may be, for example, an Analyze_Route message. The message instructs SSP 116 to execute one or more actions. The message preferably retains the subscriber number in the Calling_PartyID field.

In step 214, SSP 122 routes the call to SN 160.

In addition, in step 216, SSP 116 may play an announcement. For example, the announcement may ask the answering member to hang up.

In step 218, the answering member hangs up. Telephone line 114 is then free to accept new calls.

In step 220, SN 160 re-terminates the call from caller 130 to CPE 112.

In step 222, CPE 112 rings again. This time the answering member knows that the call is not for him or her, and lets CPE 112 rings.

In light of the above steps, a number of different embodiments may be implemented. For example, one or more of steps 234, 244, and 254 shown in FIGS. 3A, 3B, and 3C, respectively, may take place after step 222.

Figure 3A:
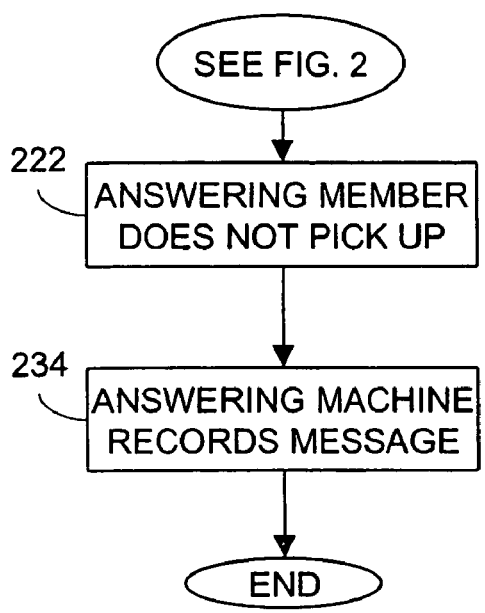
FIG. 3A is a flowchart illustrating additional exemplary steps involved in using an embodiment of the invention in which an answering machine associated with the subscriber picks up the re-terminated call.
Figure 3B:
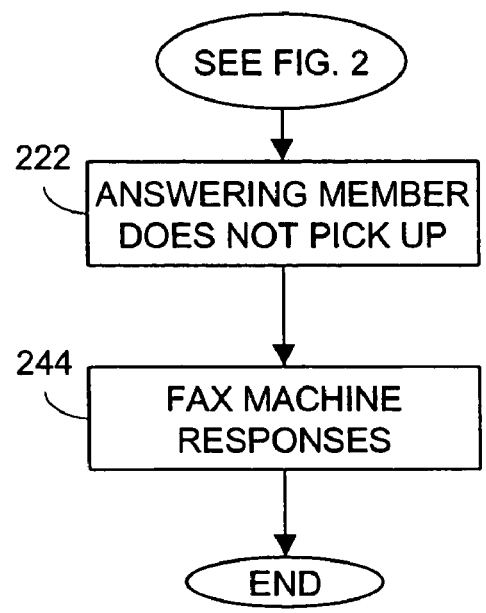
FIG. 3B is a flowchart illustrating additional exemplary steps involved in using an embodiment of the invention in which a fax machine associated with the subscriber picks up the re-terminated call.
Figure 3C:
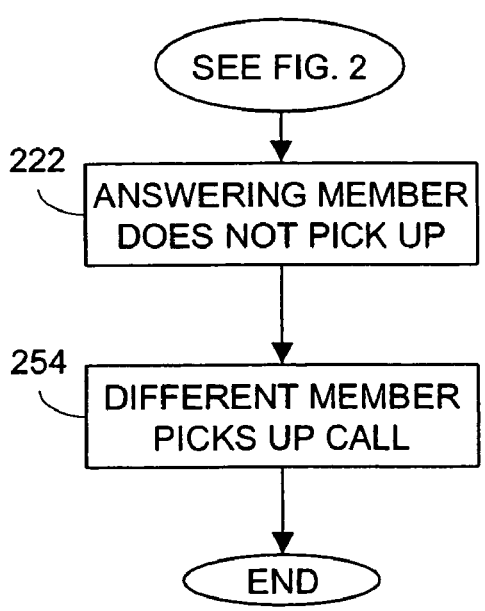
FIG. 3C is a flowchart illustrating additional exemplary steps involved in using an embodiment of the invention in which a member different from the answering member picks up the re-terminated call.

For example, as shown in FIG. 3A, if device 126 shown in FIG. 1 is an answering machine that is connected to or part of CPE 112, device 126 is activated in step 234 to record a voice message from caller 130. Alternatively, as shown in FIG. 3B, if device 126 shown in FIG. 1 is a fax machine that is connected to or party of CPE 112, device 126 is activated in step 244 to receive a facsimile transmission from caller 130. In still another alternative implementation shown in FIG. 3C, a member of subscriber 110 who is not the answering member may pick up the call in step 254.

Figure 4:
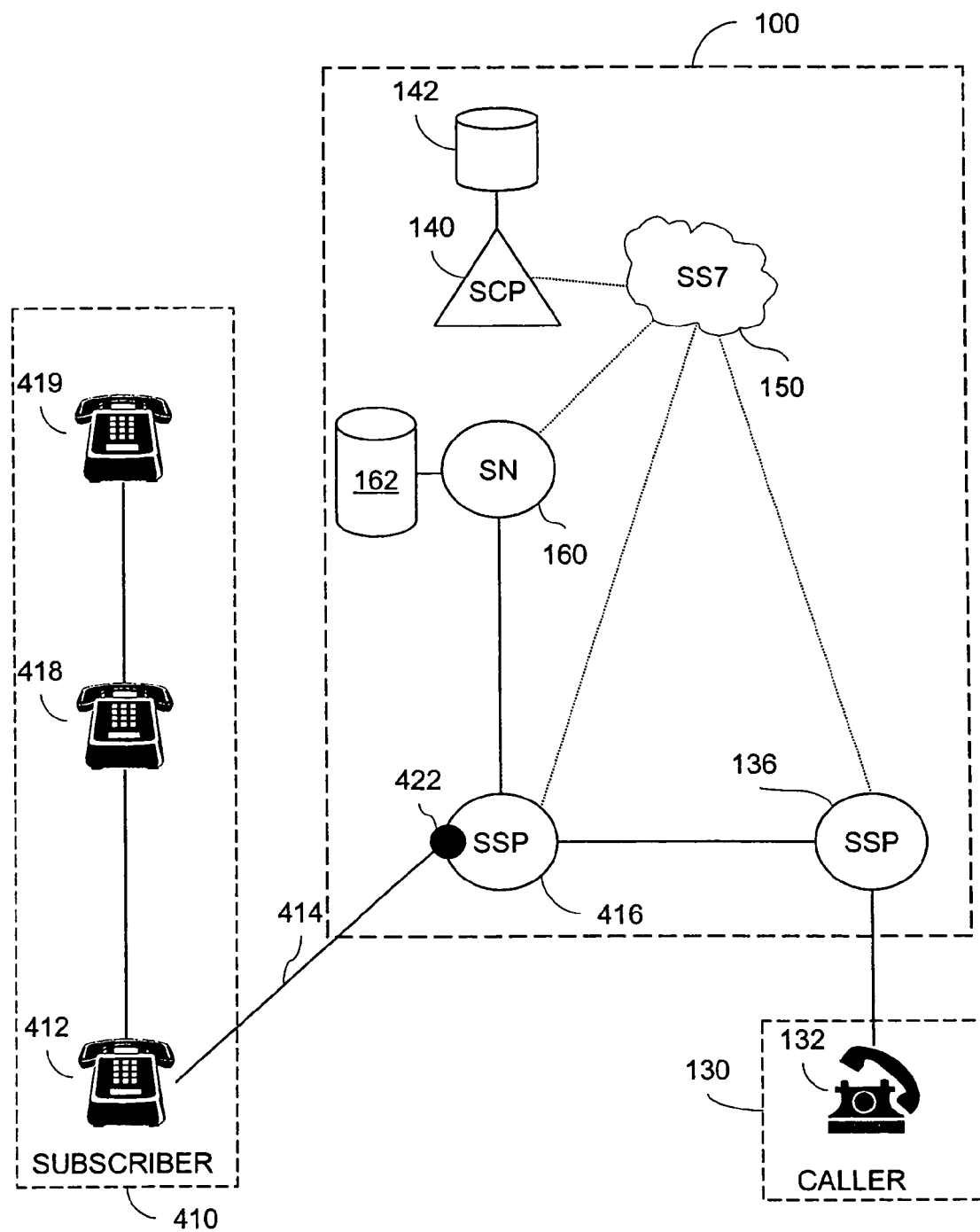
FIG. 4 is a schematic diagram showing a system architecture of another embodiment of the invention.

FIG. 4 is a schematic diagram showing a system architecture of a different embodiment of the invention adaptable for a multi-member subscriber. Subscriber 410 is served by telephone line 414, which is connected to SSP 416. Trigger 422 is provisioned on telephone line 414. Trigger 422 is preferably a CDP trigger.

In this embodiment, for illustration purposes, assume that subscriber 410 has three members. Subscriber 410 may, but is not required to, have more than one CPE. For example, each of CPE 412, 418, and 419 can be located in a different part of the house in which the members live. As an example, CPE 412, 418, and 419 may be located in the second-floor bedroom, the first-floor kitchen, and the basement, respectively.

Figure 5:
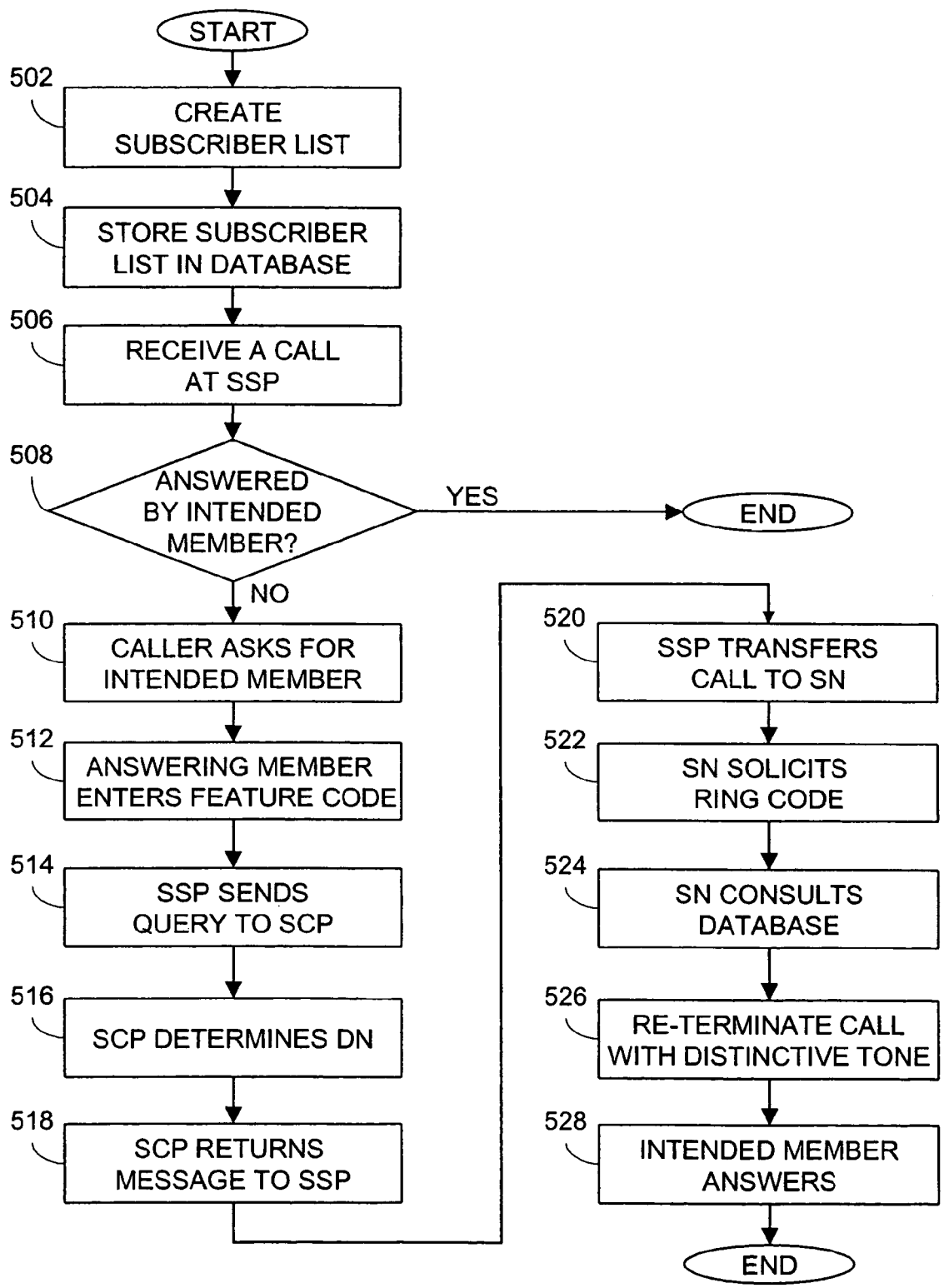
FIG. 5 is a flowchart illustrating exemplary steps involved in using another embodiment of the invention in which the re-terminated call uses distinctive ringing tones.

FIG. 5 is a flowchart illustrating exemplary steps involved in using an embodiment of the invention with references to FIG. 4. In this embodiment, a re-terminated call from SN 160 can ring using one of several distinctive ringing tones or ringing patterns. Each member of subscriber 410 can be associated with at least one of the distinctive ringing tones. With the distinctive ringing tones, each member of subscriber 410 knows whether a re-terminated incoming call is for him or her.

In step 502, a subscriber list associated with subscriber 410 is created. The subscriber list may be created by subscriber 410. The subscriber list may be uploaded or provided to the service provider of the invention via, e.g., the Internet. Preferably an Interactive Voice Response (IVR) system, may be used.

The subscriber list is associated with the telephone number of telephone line 414. The telephone number of telephone line 414 is also referred to as the subscriber number. For illustration purposes, assume that the subscriber number is 404-434-4334. Each member of subscriber 410 can be associated with at least one distinctive ringing tone or ringing pattern. For example, if subscriber 410 has three members, namely, Joe Doe, Janet Doe, and Jimmy Doe, then an exemplary subscriber list, such as that shown in Table 1 below, may be created for subscriber 410.

TABLE 1

Subscriber list associated with 404-434-4334

| Member | Ring Code | Distinctive Ringing Tone |
|--------|-----------|--------------------------|
| Joe    | 11        | No. 1                    |
| Janet  | 22        | No. 2                    |
| Jimmy  | 33        | No. 3                    |

In Table 1, the left column contains the name of each member of subscriber 410. In the middle column, a code is associated with each member. For example, Joe, Janet, and Jimmy are associated with codes "11," "22," and "33," respectively. The right column lists three distinctive ringing tones, each of which is associated with a member of subscriber 410. For example, calls for Joe, Janet, and Jimmy will be alerted using Distinctive Ringing Tone Nos. 1, 2, and 3, respectively.

In step 504, the subscriber list is stored in a database. The database is accessible by SN 160. For example, database 162 may be used to store the subscriber list.

In step 506, when caller 130 dials the subscriber number, e.g., 404-434-4334, SSP rings one or more of CPE 412, 418, and 419. The ringing tone used is preferably different from any of the distinctive ringing tones listed in Table 1.

In step 508, a member of subscriber 410 answers the call (the answering member). If this answering member happens to be caller 130's intended member of subscriber 410, then the process ends and caller 130 and the intended member engages in a voice communication session. Otherwise, if the answering member is not the intended member, then the process continues in step 510. For the following discussion, assume for illustration purposes that the answering member is Joe Doe who picks up the call using CPE 412 in the second floor bedroom.

In step 510, caller 130 informs the answering member who the intended member is. Assume for illustration purposes that the intended member is Jimmy Doe, who is not with Joe Doe in the second floor. Assume further that Joe Doe knows that Jimmy Doe is at home, but at a different location of the house, perhaps in the basement.

In step 512, the answering member presses one or more keys on a keypad of CPE 412. The keys pressed by the answering member can be any key on the keypad that have been programmed to implement a service of the invention. For example, the answering member may press the "Flash" key. The answering member may also press additional keys after the "Flash" key. For example, the answering member may press "Flash" followed by a feature code, e.g., "88", for the on-demand recall service of the present invention.

In step 514, SSP 416 sends a query to SCP 140. The query is preferably an Info_Analyzed query.

In step 516, SCP 140 determines a directory number (DN) which can be used to route the call to SN 160.

In step 518, SCP 140 returns that DN in the Called_Party field in the Analyze_Route response.

In step 520, SSP 416 routes the call to SN 160.

In step 522, SN 160 asks and receives from subscriber 410 a ring code. For example, Joe Doe may supply "33" in step 522.

In step 524, SN 160 accesses database 162 to determine which ringing tone is associated with the ring code. In the example, Ring Code "33" is associated with Distinctive Ringing Tone No. 3.

In step 526, SN 160 instructs subscriber 410 to hangup and immediately place call to subscriber 410. Distinctive Ringing Tone No. 3 is used to ring one or more of CPE 412, 418, and 419.

In step 528, the answering member who recognizes the distinctive ringing tone picks up one of CPE 412, 418, and 419. In an example in which Ring Code "33" was received in step 522, Jimmy picks up the call using CPE 419. When that call is answered by another member subscriber 410, (e.g., Jimmy Doe) in step 528, SN 160 bridges the original call and the new call. At that point SN 160 drops out of the picture.

In this embodiment, SN 160 collects the ring code from subscriber 410 in step 522. In another embodiment, SN 160 may collect other information, e.g., mailbox number to forward the call to a mailbox service.

Figure 6:
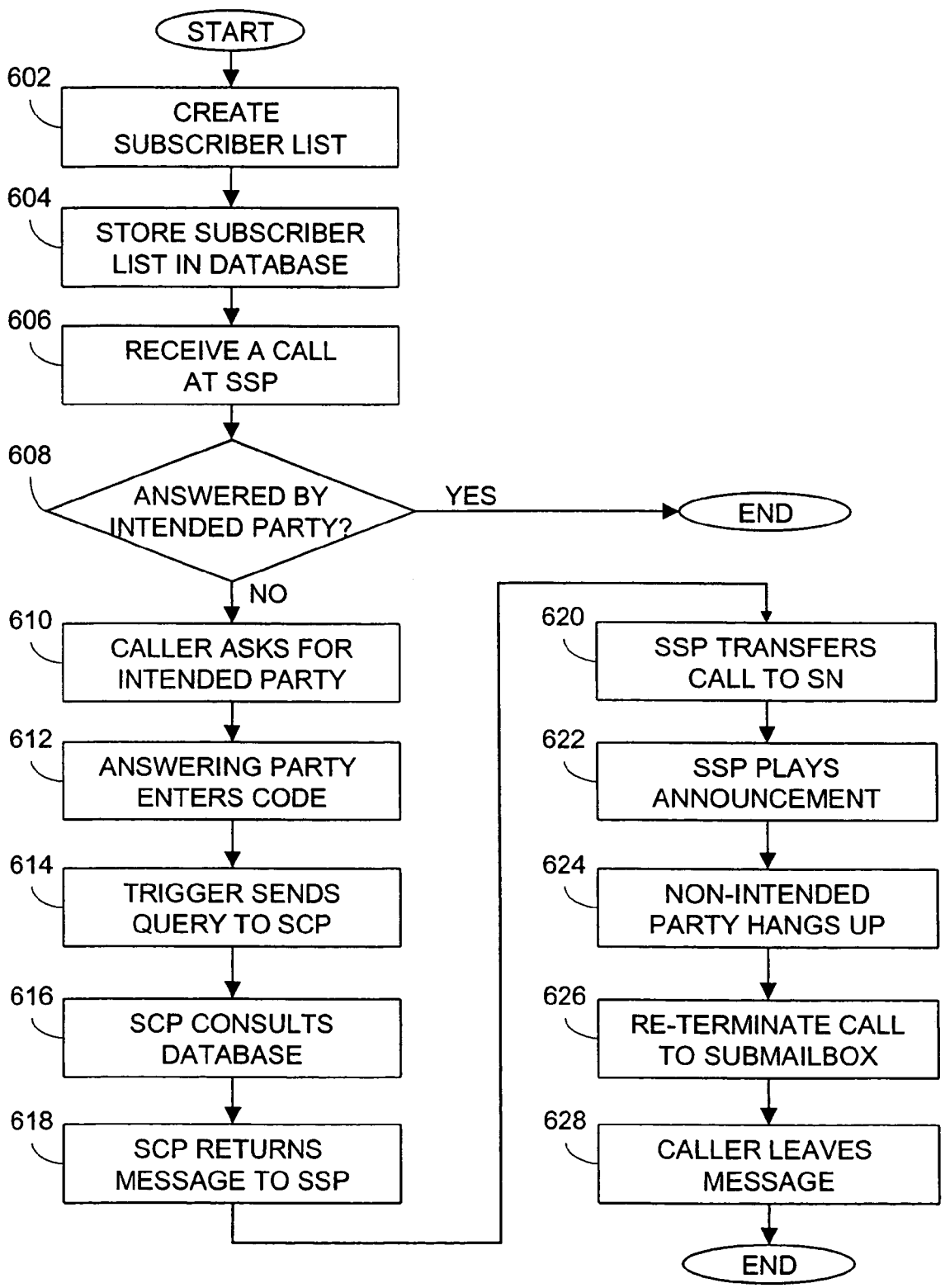
FIG. 6 is a flowchart illustrating exemplary steps involved in using another embodiment of the invention in which the call is routed to a voice mailbox of an intended member.

FIG. 6 is a flowchart illustrating exemplary steps involved in using another embodiment of the invention. Steps 602 through 610 are generally similar to corresponding steps 502 through 510 described above. Differences are noted below.

For example, the subscriber list created in step 602 may contain an additional column as shown in Table 2 below.

TABLE 2

Subscriber list associated with 404-434-4334

| Member | Ring Code | Distinctive Ringing Tone | Mailbox Number |
|---|---|---|---|
| Joe | 11 | No. 1 | 001 |
| Janet | 22 | No. 2 | 002 |
| Jimmy | 33 | No. 3 | 003 |

In Table 2, the far right column contains mailbox numbers that are associated with members of subscriber 410. For example, Joe, Janet, and Jimmy are associated with Mailbox Numbers "001," "002," and "003," respectively.

Steps 604 through 608 are similar to corresponding steps 504 through 508, respectively.

In step 610, caller 130 informs the answering member who the intended member is. Assume for illustration purposes that the intended member is Janet Doe, who is not with Joe Doe in the second floor. Assume further that Joe Doe knows that Janet Doe is not home, and caller 130 chooses to leave a voicemail in Janet Doe's voice mailbox.

In step 612, the answering member presses one or more keys on keypad of CPE 412. The keys pressed by the answering member can be any key on the keypad that have been programmed to implement a service of the invention. For example, the answering member may press the "*" key. The answering member may also press additional keys after the "*" key. For example, Joe Doe may press "*" followed by the sequence of the "0", "0", and "2" to designate Janet Doe as the intended member.

In step 614, when trigger 422 that is provisioned on telephone line 414 detects the sequence of keys pressed by the answering member using CPE 412, trigger 422 causes SSP 416 to launch a query to SCP 140. The query contains, among other information, the subscriber number in the Calling_Party_ID field.

In addition, the numbers following the "*" key entered by the answering member may be placed in another field of the query. For example, a Member_Mailbox field may be created in the query to accommodate the "003" number entered by the answering party. Another method for carrying the three-digit member mailbox number is to expand the Calling_Party_ID field from 10 to 13 digits. The three-digit member mailbox number can be added in the Calling_Party_ID field as a prefix or a suffix. Still another alternative would be to have SN 160 solicit the mailbox number, which is similar to soliciting a ring code discussed above in steps 512 through 526.

In step 616, SCP 140 consults database 142. Using the information in the Calling_Party_ID field of the query, which is the subscriber number, SCP 140 accesses, for example, the subscriber list of subscriber 410. If the Calling_Party_ID field contains 404-434-4334, for example, then Table 2 is retrieved and reviewed by SCP 140. With the information in the Member_Mailbox field or in the prefix or suffix of the Calling_Party_ID field of the query, it can be determined which member mailbox should be used during re-termination of the call.

In step 618, SCP 140 returns a message to SSP 416. The message from SCP 140 to SSP 416 may be, for example, an Analyze_Route message. The message contains a number of fields. For example, the Member_Mailbox field contains the member mailbox number that is associated with the intended member. The message also contains the subscriber number.

In step 620, SSP 416 transfers the call to SN 160.

In step 622, SSP 416 may also play an announcement asking the answering member to hang up.

In step 624, the answering member hangs up.

In step 626, SN 160 re-terminates the call from caller 130 to SSP 416. SSP 416 then forwards the call to the appropriate mailbox associated with the member mailbox number.

In step 628, after the call is routed to the mailbox of the intended member, caller 130 leaves a voice message.

In describing representative embodiments of the invention, the specification may have presented the method and/or process of the invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the invention should not be limited to the performance of their steps in the order written, and one skilled in the art can readily appreciate that the sequences may be varied and still remain within the spirit and scope of the invention.

The foregoing disclosure of the embodiments of the invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

What we claim is:

1. A method for re-terminating a telephone call terminated to a subscriber phone number in an advanced intelligent network comprising the steps of:

storing member information related to the subscriber phone number in a database accessible to a service control point;

terminating a call to the subscriber phone number;

detecting a sequence of key strokes from customer premises equipment on a subscriber line associated with the subscriber phone number, wherein the sequence is detected by a trigger provisioned on the subscriber line;

launching a query by a service switching point associated with the subscriber line to the service control point, wherein at least part of the sequence is incorporated into the query;

consulting the database to review the member information;

transferring the call to a service node; and re-terminating the call in accordance with the member information.

2. The method of claim 1, wherein the call is re-terminated to the customer premises equipment.

3. The method of claim 2, wherein the call is picked up by one of an answering machine, a fax machine, and a second member of the subscriber.

4. The method of claim 1, wherein the sequence of keystrokes is associated with an intended member of the subscriber.

5. The method of claim 4, wherein the call is re-terminated with a distinctive ringing tone associated with the intended member.

6. The method of claim 5, wherein the call is picked up by the intended member.

7. The method of claim 6, wherein the call is re-terminated to a voice mailbox associated with the intended member.

8. The method of claim 7, further comprising the step of instructing the answering member to hang up.

9. A computer program embodied on a computer readable medium, the computer program for re-terminating a telephone call to a subscriber phone number in an advanced intelligent network, the program comprising the steps of:

storing member information related to the subscriber phone number in a database accessible to a service control point;

terminating a call to the subscriber phone number;

detecting a sequence of key strokes from customer premises equipment on a subscriber line associated with the subscriber phone number, wherein the sequence is detected by a trigger provisioned on the subscriber line;

launching a query by a service switching point associated with the subscriber line to the service control point, wherein at least part of the sequence is incorporated into the query;

consulting the database to review the member information;

transferring the call to a service node; and re-terminating the call in accordance with the member information.

10. The computer readable medium of claim 9, wherein the call is re-terminated to the customer premises equipment.

11. The computer readable medium of claim 10, wherein the call is picked up by one of an answering machine, a fax machine, and a second member of the subscriber.

12. The computer readable medium of claim 9, wherein the sequence of keystrokes is associated with an intended member of the subscriber.

13. The computer readable medium of claim 12, wherein the call is re-terminated with a distinctive ringing tone associated with the intended member.

14. The computer readable medium of claim 13, wherein the call is picked up by the intended member.

15. The computer readable medium of claim 12, wherein the call is re-terminated to a voice mailbox associated with the intended member.

16. The computer readable medium of claim 9, the program further comprising the step of instructing the answering member to hang up.

* * * * *